United States Patent [19]
Hoover

[11] 3,952,236
[45] Apr. 20, 1976

[54] VEHICLE SPEED REGULATION SYSTEM

[75] Inventor: James William Hoover, North East, Pa.

[73] Assignee: General Electric Company, Erie, Pa.

[22] Filed: July 19, 1974

[21] Appl. No.: 490,128

[52] U.S. Cl. .............................. 318/139; 318/326; 318/341
[51] Int. Cl.² .......................................... H02P 5/16
[58] Field of Search ............ 318/319, 326, 341, 139

[56] References Cited
UNITED STATES PATENTS

| | | | |
|---|---|---|---|
| 3,340,951 | 9/1967 | Vitt | 318/327 UX |
| 3,349,308 | 10/1967 | Strand | 318/314 |
| 3,500,190 | 3/1970 | Michon | 318/326 X |
| 3,543,112 | 11/1970 | Richmond | 318/327 X |
| 3,609,488 | 9/1971 | Sampson et al. | 318/171 |
| 3,629,677 | 12/1971 | Means | 318/327 X |
| 3,630,304 | 12/1971 | Sahinkaya | 318/327 X |
| 3,764,888 | 10/1973 | Anderson | 322/20 |

*Primary Examiner*—Gene Z. Rubinson
*Attorney, Agent, or Firm*—Dana F. Bigelow; Walter C. Bernkopf

[57] ABSTRACT

A digital tachometer provides a signal proportional to output speed which clocks a multivibrator whose "on" time is selectively set as a function of desired speed. The output is filtered and any deviation from one-half the peak voltage becomes the speed error signal which is pulse width modulated to provide an error signal to the prime mover. Proper selection of multivibrator parameters provides for a plurality of output pulse widths which accommodate sensitive speed regulation over a low speed range.

8 Claims, 12 Drawing Figures

3,952,236

VEHICLE SPEED REGULATION SYSTEM

BACKGROUND OF THE INVENTION

This invention relates generally to motive power systems and more particularly to systems for speed regulation of a motor in response to a resultant error signal.

Control of power application to vehicles powered by electromotive means is commonly accomplished by deriving an analog voltage signal proportional to motor speed and comparing it with an analog reference signal to produce an error signal which is in turn applied to the regulating system to change the motor speed. This change tends to bring the vehicle actual speed into conformance with the vehicle desired speed. Since the accuracy of a typical analog system decreases as the speed decreases, and since a weak signal at low speeds results in a slot reaction, such a system is not satisfactory for low speed operation.

An alternative method well known in the art is that of using a digital tachometer whose output signal frequency is proportional to velocity and whose accuracy is fixed irrespective of vehicle speed. The signal of constant width pulses is filtered and the resulting d-c signal is compared with a reference voltage to generate an error signal to the motor. Since the width of the pulses are constant throughout the speed range of the vehicle and since it is necessary to use narrow pulses to accommodate high frequencies, then at low frequencies the accuracy is necessarily depreciated. In certain instances this may be of great concern, as for example, when maintaining creep control at speeds of approximately one-half mile per hour during the loading of coal into a vehicle.

It is therefore an object of this invention to provide a speed regulation system for vehicles operating at low speed ranges.

Another object of this invention is the provision for a speed regulation system which is accurate at very low speeds and is capable of effective speed regulation at higher speeds.

Yet another object of this invention is the provision for a speed regulation system which is equally sensitive and accurate over a range of low speeds.

Still another object of this invention is the provision for a speed regulation system which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, a retriggerable monostable multivibrator is triggered on in response to a square wave signal representative of vehicle speed as sensed by a digital tachometer. The multivibrator stays on for a period determined by the selected speed of the vehicle and the output of the multivibrator is thus a square wave having constant pulse widths as determined by the desired speed setting and having a frequency equal to that of the tachometer input signal. The square wave output is then actively filtered to obtain a d-c signal having an amplitude which depends on the difference, if any, between the sensed speed of the vehicle and the selected speed thereof. The d-c signal which is then amplified and pulse width modulated to obtain a square wave control signal which is applied to the excitation system of the vehicle propulsion equipment.

In accordance with another aspect of the invention the d-c signal is amplified such that when a balanced speed condition exists the d-c signal is at its midpoint and the resulting control signal is at a 50% duty cycle.

By another aspect of this invention different capacitive timing components of the multivibrator are switched in at various speed stages so as to obtain wider pulses at lower speeds, and allow for the potentiometer to be adjusted over its full range within each one of the capacitor ranges.

Yet another aspect of this invention provides for a rate-of-change limit during start-up when the vehicle is stopped and a large error signal immediately exists.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
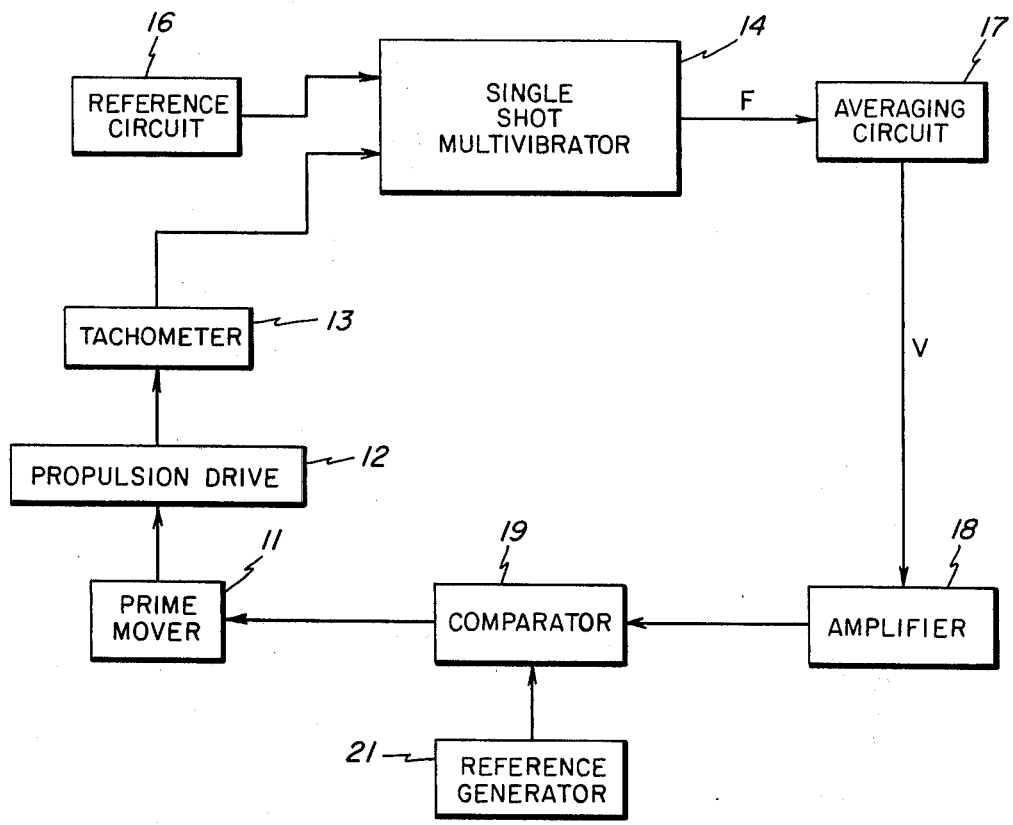
FIG. 1 is a schematic block diagram of the preferred embodiment of the invention.
Figure 2A:
FIG. 2 is a graphic illustration of various waveforms that are generated within the system of the preferred embodiment.
Figure 2B:
Figure 2C:
Figure 2D:

Referring now to FIG. 1 a closed loop system is shown in accordance with the present invention including a prime mover 11 connected to drive a propulsion drive system 12, as for example, in a diesel electric locomotive where a diesel engine drives electric propulsion motors to propel the vehicle. The actual speed of the vehicle is sensed by an axle mounted tachometer 13 of the digital type, and the output signal (see waveform of FIG. 2(a)) whose frequency is proportional to speed is transmitted to clock a monostable or "one-shot" multivibrator 14 whose "on" time is set as a function of the desired speed by proper selections in the reference circuit 16. When the actual speed as sensed by the tachometer 13 is equal to the desired speed as set by the reference circuit, then the output signal F of the multivibrator is a 50% duty cycle wave as is shown in FIG. 2(b). When the frequency of the tachometer output signal is less than the desired frequency as is shown in FIG. 2(c), then the output signal of the multivibrator is at less than 50% duty cycle as is seen in the waveform of FIG. 2(d). Conversely, if the vehicle speed is higher than that called for the duty cycle of the multivibrator output would be greater than 50%. Any variance one way or the other from the 50% duty cycle represents an error signal which must be applied to the system.

Figure 2E:

The square wave output signal F from the multivibrator passes to an averaging circuit 17, where it is converted into a d-c signal V whose amplitude is normal (i.e., at mid scale when the actual velocity equals the desired velocity and varies from normal as the actual velocity changes from desired. This signal passes to the amplifier 18 which sets the gain of the system and limits the rate of application of power, and the amplified signal passes to a comparator 19 where it is compared with a reference signal 21 to derive an error signal. The comparator 19 comprises a pulse width modulator which compares the d-c signal with a triangular waveshape of fixed amplitude and frequency as shown in FIG. 2(e). When a balanced speed has been attained, the d-c signal of waveform 2(e) is midway between the triangular wave peaks and the output duty cycle (FIG. 2(f)) is at 50% to provide ½ maximum power.

Assuming now that a disturbance occurs so as to cause the vehicle speed to decrease and the signals of waveforms 2(c) and 2(d) to be produced. Since the duty cycle of waveform 2(d) is less than 50%, the d-c level of the signal V from the averaging circuit 17 becomes lower than normal, and when introduced into the comparator 19 (see FIG. 2(g)) the resulting error signal duty cycle (FIG. 2(h)) becomes greater so as to apply more power to the drive system and thereby increase the vehicle speed. Conversely, if the vehicle speed reaches a level above the desired speed then the resulting waveforms will be as in 2(j) and 2(k) to reduce the applied power and speed of the vehicle.

Figure 3:
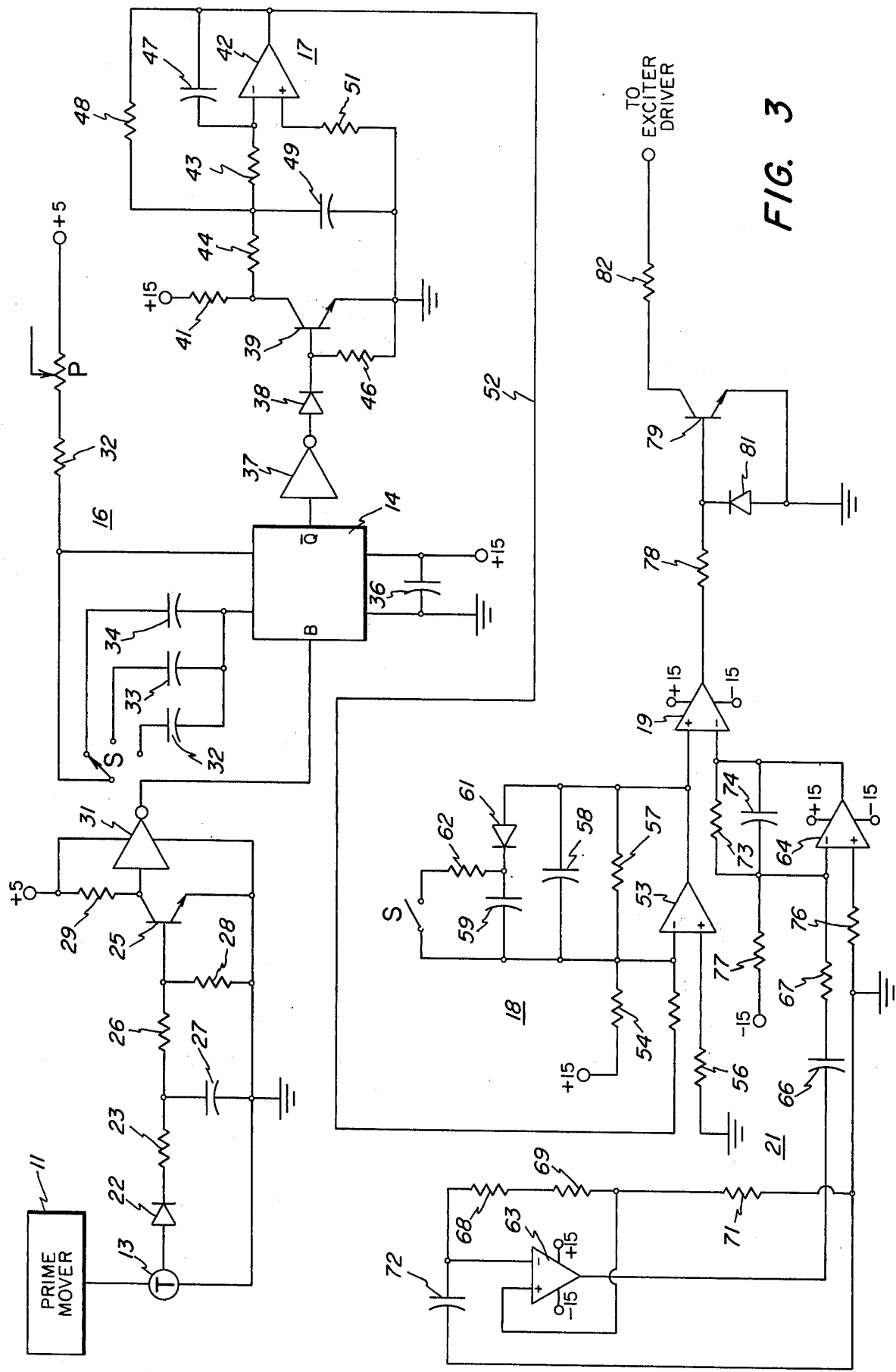
FIG. 3 is a schematic diagram of the circuitry of the preferred embodiment of the invention.

Referring now to FIG. 3 the circuitry of the invention is shown in detail and includes the prime mover 11, tachometer 13, retriggerable monostable multivibrator 14, reference circuitry 16, averaging circuit 17, amplifier 18, comparator 19 and reference generator 21. The tachometer 13 is driven by the prime mover 11 to provide a square wave signal to the base of an NPN transistor 25 by way of a serially connected diode 22 and resistances 23 and 26. A capacitor 27 connected between the junction of the two resistances and ground completes a filter network for the removal of noise which could cause the inadvertent triggering of the monostable multivibrator 14. A resistance 28 is connected across the capacitor to provide a path for the transistor base leakage current. The collector of the transistor 25 is connected through resistor 29 to a constant potential source and to the input of an inverting amplifier 31. The transistor emitter is connected to ground.

The inverted output from amplifier 31 passes to the B terminal of the monostable multivibrator 14 to trigger it on when the signal goes negative. It stays on until the various timing components of the reference circuit 16 allow it to turn off. The timing components comprise a fixed resistance 32 and a potentiometer P in series between the multivibrator and a fixed voltage source. Connectable across the terminals are the capacitors 33, 34 and 36, with the desired capacitance level being selected by a switch S to accommodate a particular speed range. In other words the pulse width of the multivibrator output is selectively adjusted to one of three different levels by selection of the proper capacitance. For lower speeds the pulse width is maximized to enhance the system accuracy, whereas at higher speeds the pulse width is narrowed to accommodate the high frequency pulse train. Typically the three capacitors accommodate the speed ranges ¼ – 1 mph, ¾ – 3 mph and 2 – 8 mph, respectively, and the potentiometer is adjusted continuously to set the desired speed within the 0 – 8 mph range.

At the power supply terminals a capacitance 36 is provided between the voltage source and ground for noise suppression. The multivibrator operates in a conventional manner as described in Pulse, Digital, and Switching Waveforms, Millman and Taub, McGraw Hill Inc., 1965.

At the output terminal Q of the multivibrator there is thus produced a square wave pulse train whose repetition frequency is equal to that of the tachometer input signal and whose pulse width is fixed by the timing components. This output is inverted by an inverting amplifier 37 (both gates 31 and 37 are installed for the purpose of isolating the multivibrator) and passed through a diode 38 to the averaging circuit 17 where it is converted to a d-c signal whose amplitude varies directly with speed differential (i.e., with the amount by which the actual velocity of the vehicle differs from a balanced speed condition wherein its just equals the desired velocity) and is at mid scale when in a balanced speed condition. The averaging circuit is simply an active filter wherein the input goes to the base of an NPN transistor 39 whose collector is connected to a positive source through a resistance 41, and to the input terminal of an amplifier 42 through resistances 43 and 44. The emitter of the transistor 39 is connected to ground and a resistance 46 is connected between the transistor base and ground. The amplifier 42 has feedback loops with a capacitor 47 and a resistance 48. A capacitor 49 is connected between ground and the junction of resistances 43 and 44 and a resistor 51 is placed between the amplifier and ground.

Line 52 transmits the d-c signal from the filter output to the amplifier 18 which sets the gain of the system and controls the initial rate of change. An operational amplifier 53 has an input resistor 54, ground resistor 56 and feedback resistor 57 and capacitor 58. A fixed bias voltage is provided to set the system at a 50% duty cycle and to provide the desired sensitivity of operation. For example, at a balanced speed condition the output of the amplifier 18 is at mid range, but the occurrence of a change of speed 1% will cause a change of the d-c voltage signal of approximately 8 – 10% and thereby create an immediate response to reduce the error signal. During start-up the initial rate of change is limited by a capacitor 59 and diode 61 connected around the operational amplifier 53 so as to allow the output to change slowly for positive going signals but permit rapid change for negative outputs. This limits the rate of application of initial power wherein the train is stopped and a large error signal immediately exists on start-up. A switch S, and associated resistance 62 is provided to short the amplifier when the switch is closed so as to present a zero output from the amplifier and thereby inactivate the system.

Figure 2F:
Figure 2G:
Figure 2H:
Figure 2J:
Figure 2K:

During active operation the amplifier d-c signal goes to the comparator 19 where it is compared with a triangular reference wave from the reference signal generator 21. This generator comprises a pair of operative amplifiers 63 and 64 with the output of the first 63 going to the input of the second 64 through a capacitor 66 and resistance 67. Amplifier 63 has in its feedback network a feedback resistor 68 in one loop and the resistors 69 and 71 along with a timing capacitor 72 in the other loop so as to comprise a square wave oscillator whose output is capacitively coupled to the integrating circuit 64 having feedback resistor 73, feedback capacitor 74, and ground resistor 76. A negative bias is applied through resistor 77. The resultant waveform is a sawtooth signal which is compared with the d-c signal in the comparator 19 to obtain a square wave signal as shown in FIGS. 2(e) and 2(f). The square wave signal is applied through resistor 78 to the base of a transistor 79 whose emitter is tied to ground with a clamping diode 81 back to the base to prevent any reverse voltage condition from exceeding a safe limit. The transistor collector is connected through resistor 82 to the exciter driver where the square wave signal is applied to regulate the excitation level of the generator and hence the power to the motor.

In operation assume that the vehicle is initially at a standstill and that the potentiometer P is set to represent a desired speed. A speed differential will exist but an error signal will not be immediately applied because of the rate limiting components of the amplifier 18. After a delay period an error signal will be generated, and as long as the vehicle speed signal as sensed by the tachometer is less than the desired speed as set by the potentiometer, the multivibrator output will be at less than 50% duty cycle, the d-c signal will be below its mid point, and the square wave control signal to the exciter will be at greater than 50% duty cycle. The reaching of a balanced speed condition will result in a 50% duty cycle from the multivibrator and to the exciter, and an overspeed condition will result in a waveform at greater than 50% duty cycle from the multivibrator and less than 50% duty cycle to the exciter. If after the potentiometer has been adjusted through its complete range, a greater speed is desired, then the switch S is moved to bring in another capacitance level so as to enable the further widening of the multivibrator output pulses. The potentiometer P may then be adjusted through its complete range until the third capacitive stage is brought in for a still higher speed range. In this way accurate and sensitive speed regulation is maintained throughout a range of low speeds.

What I claim as new and desire to secure by Letters Patent of the United States is:

1. A speed regulation system for low speed vehicles comprising:
    a. means for generating a first pulse train whose frequency is proportional to actual vehicle speed;
    b. a monostable multivibrator for responsively generating a second pulse train whose repetition frequency is equal to that of said first pulse train;
    c. means comprising a potentiometer and a plurality of varied capacitors which are capable of being individually switched into the timing circuit of said multivibrator for varying the pulse width of said second pulse train as a function of the desired vehicle speed, said multivibrator having a 50% duty cycle when the vehicle actual speed equals the vehicle desired speed;
    d. means for filtering said second pulse train to obtain a d-c signal whose amplitude varies with any difference between the actual and desired speeds;
    e. means for comparing said d-c signal with a reference signal to obtain an error signal; and
    f. means for applying said error signal to regulate the actual vehicle speed.

2. A speed regulation system for controlling the speed of a vehicle by comparing the actual speed with the desired speed thereof and applying the resultant error signal to change the actual speed comprising:
    a. a digital tachometer whose output frequency is proportional to the vehicle speed;
    b. a monostable multivibrator which is triggered on in response to said tachometer output to provide an output of the same frequency;
    c. means for selectively varying the duration of the multivibrator output in inverse proportion to the desired vehicle speed such that said monostable multivibrator has a 50% duty cycle when the vehicle actual speed equals the desired speed;
    d. means for filtering the monostable multivibrator output to obtain a d-c signal whose amplitude is normal when the actual speed equals the desired speed and deviates from normal in proportion to the difference, if any, between actual and desired speeds;
    e. means for comparing said d-c signal with a reference signal to derive a speed error signal representative of the deviation from normal of said d-c signal; and
    f. means for applying said speed error signal to regulate the actual speed.

3. A speed regulation system as set forth in claim 2 wherein said output duration varying means comprises a potentiometer and a plurality of different valued capacitors capable of being individually switched into the timing circuit of said multivibrator.

4. A speed regulation system as set forth in claim 2 wherein said filtering means includes means for amplifying the average magnitude of said second pulse train such that a change in percentage of the actual vehicle speed will bring about a significantly greater percentage change in said d-c signal.

5. A speed regulation system as set forth in claim 2 wherein said comparing means is a pulse width modulator.

6. A speed regulation system as set forth in claim 5 wherein said reference signal is a fixed frequency and amplitude sawtooth curve.

7. A speed regulation system as set forth in claim 2 and including means for filtering said tachometer output signal to prevent inadvertent triggering of said multivibrator.

8. A speed regulation system as set forth in claim 2 wherein said tachometer output is a square wave.

* * * * *